H. EBNER.
METHOD OF MAKING SCYTHES.
APPLICATION FILED APR. 1, 1916.
1,207,517.
Patented Dec. 5, 1916.
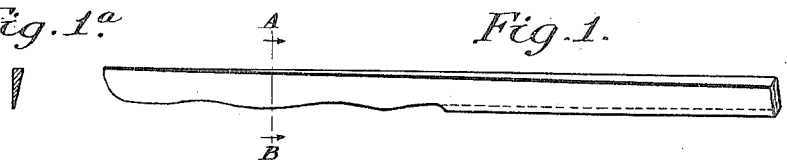
*Fig. 1.ᵃ*    *Fig. 1.*
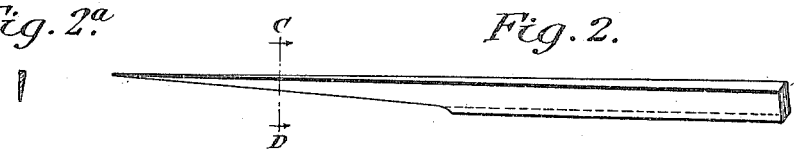
*Fig. 2.ᵃ*    *Fig. 2.*
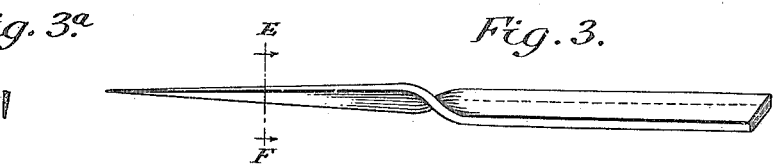
*Fig. 3.ᵃ*    *Fig. 3.*
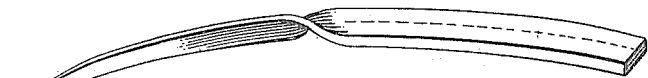
*Fig. 4.*
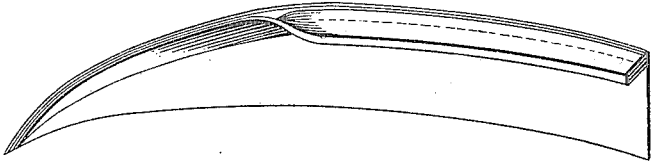
*Fig. 5.*
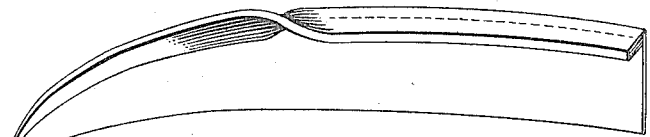
*Fig. 6.*
Inventor:
Herbert Ebner,
By B. Singer
Atty.

UNITED STATES PATENT OFFICE.

HERBERT EBNER, OF VIENNA, AUSTRIA-HUNGARY.

METHOD OF MAKING SCYTHES.

1,207,517.  Specification of Letters Patent.  Patented Dec. 5, 1916.

Application filed April 1, 1916. Serial No. 88,391.

*To all whom it may concern:*

Be it known that I, HERBERT EBNER, a subject of the Emperor of Austria-Hungary, residing at Vienna, in the Austro-Hungarian Empire, have invented a new and useful Method of Making Scythes, of which the following is a specification.

In making scythes by welding the various parts together with the assistance of the electric current the back of the blade is made by welding a suitably shaped piece to the blade proper.

The piece used to form the back tapers down from the shank toward the point, but still the width of contact between this back piece and blade is the same at all parts. This shape of the scythe back gives rise to considerable difficulties in connecting it to the blade, and very often the point of the blade is burnt during the welding process. This drawback is due to the fact that the welding temperature required for connecting the back piece and blade is about the same at all parts, and this temperature is often too high for the point where the thickness of the metal is reduced.

The production of scythes with elastic points, which for many purposes are absolutely necessary, is nearly impossible according to existing processes. The connection of the back and blade of a scythe in such a manner as will answer all requirements and will resist all strains occurring in practice cannot be carried out by the usual process.

All the above drawbacks can be avoided, if, in contradistinction to the existing method, the back piece of the scythe has not the same width of contact with the blade throughout its entire length, but is made with its point, and the parts near same, according to the length of the point of the scythes, with a greater width of contact with the blade proper than the remaining part of said back. This object can be obtained by giving the back of the scythe a particular shape, and by twisting the parts through an angle of about 90° in regard to each other, which renders it possible to connect the rear or upper end of the back piece to the blade with the usual comparatively narrow surface of contact, while the front or lower end, which forms the point, has a much broader surface of contact and connection.

In this way it is possible, to absolutely prevent the point of the scythe from being burnt, and to produce a perfectly elastic point. Further, the shape of the point thus produced corresponds with that of the scythes wrought by hand in one piece.

On the accompanying drawing the various forms of the back piece which come into question in carrying out the new method, and a perspective view of the new scythe blade are shown by way of example.

The back piece represented in Figure 1 has already undergone the first operation, the front or lower part thereof being so tapered down that it has a one-sided wedge form, and thus is of decreasing thickness toward the end. Fig. 1$^a$ is a cross section of the piece shown in Fig. 1. Fig. 2 represents the back piece after it has undergone a further operation, the point being suitably tapered down. Fig. 2$^a$ is a cross section of the piece shown in Fig. 2. Fig. 3 shows the lower end of the back piece twisted through an angle of about 90°. Fig. 3$^a$ is a cross section of the piece shown in Fig. 3. Fig. 4 represents the back piece according to Fig. 3 after it has been curved in accordance with the shape of the blade. Fig. 5 shows the back piece welded to the scythe blade, and from this figure it will be seen how the upper or rear part of the back piece, with its comparatively thin edge, and the lower or front part, with a broad surface, are welded to the blade. Fig. 6 illustrates the finished scythe.

The connection between the scythe blade and back piece is effected by electric welding. A scythe of this kind, as mentioned above, has a perfectly elastic point, and is very durable in comparison with scythes welded in any other known manner. It cannot be distinguished exteriorly, or by its properties, from scythe blades made in one piece by hand.

What I claim and desire to secure by Letters Patent of the United States is:—

1. The method of making scythes which consists in making the part of the back piece which forms the point of the scythe broader, forming the point by cutting, twisting the back thus formed some distance from the point through an angle of about 90°, and in welding said twisted piece to the blade proper, substantially as, and for the purpose, set forth.

2. The method of making scythes which consists in making the scythe blade proper and back piece in two different parts, twisting the back piece some distance from its point so as to bring a wider surface in contact with said blade proper, and in welding the two parts together, substantially as, and for the purpose, set forth.

In testimony whereof I have signed my name to this specification in the presence of two subscribing witnesses.

HERBERT EBNER.

Witnesses:
 JOHANN FLEISCHMANN,
 AUGUST FUGGER.

Copies of this patent may be obtained for five cents each, by addressing the "Commissioner of Patents, Washington, D. C."